(12) United States Patent
Elkington et al.

(10) Patent No.: US 10,222,498 B2
(45) Date of Patent: Mar. 5, 2019

(54) SYSTEM AND METHOD FOR JOINT INVERSION OF BED BOUNDARIES AND PETROPHYSICAL PROPERTIES FROM BOREHOLE LOGS

(71) Applicant: Weatherford Technology Holdings, LLC, Houston, TX (US)

(72) Inventors: Peter Elkington, Loughborough (GB); Hamed Chok, Houston, TX (US); James Whetton, Nottingham (GB)

(73) Assignee: Weatherford Technology Holdings, LLC, Houston, TX (US)

( * ) Notice: Subject to any disclaimer, the term of this patent is extended or adjusted under 35 U.S.C. 154(b) by 653 days.

(21) Appl. No.: 14/713,591

(22) Filed: May 15, 2015

(65) Prior Publication Data

US 2016/0334531 A1 Nov. 17, 2016

(51) Int. Cl.
*G01V 1/30* (2006.01)
*G01V 5/04* (2006.01)
*G01V 11/00* (2006.01)
*G01V 1/50* (2006.01)

(52) U.S. Cl.
CPC .............. *G01V 1/303* (2013.01); *G01V 1/50* (2013.01); *G01V 5/04* (2013.01); *G01V 11/00* (2013.01)

(58) Field of Classification Search
CPC ...... G01V 1/50; G01V 2210/624; G01V 5/04; G01V 1/303; E21B 47/00
See application file for complete search history.

(56) References Cited

U.S. PATENT DOCUMENTS

| 4,313,164 | A | 1/1982 | Regat |
| 4,314,338 | A | 2/1982 | Suau et al. |
| 5,675,147 | A | 10/1997 | Ekstrom et al. |
| 5,867,806 | A | 2/1999 | Strickland et al. |
| 6,253,155 | B1 | 6/2001 | Hagiwara |

(Continued)

FOREIGN PATENT DOCUMENTS

| GB | 2500584 A | 2/2013 |
| WO | 2014/011190 A1 | 1/2014 |
| WO | 2015/048742 A1 | 4/2015 |

OTHER PUBLICATIONS

Combined Search and Examination Report in counterpart GB Application No. GB1608472.5 dated Oct. 27, 2016, 8 Pages.

(Continued)

*Primary Examiner* — Elias Desta
(74) *Attorney, Agent, or Firm* — Blank Rome LLP

(57) ABSTRACT

Systems and methods for optimizing bed boundary locations and prediction of associated petrophysical property values of a wellbore in a reservoir formation are disclosed. To optimize bed boundary locations and predict petrophysical property values, a process can be used in which a high resolution wellbore log is used to get an initial estimate of boundary positions. The initial estimate can then be used to constrain a joint optimization of bed positions and associated petrophysical property values. Such a process automates both the generation of a single set of boundaries that are common to all measurements and the prediction of petrophysical properties via joint inversion. The same inversion process can be used to derive quality indicators on the corrected bed boundary locations and the petrophysical property values.

43 Claims, 4 Drawing Sheets

(56) References Cited

U.S. PATENT DOCUMENTS

| | | | |
|---|---|---|---|
| 6,704,436 | B1 | 3/2004 | Anxionnaz et al. |
| 7,124,029 | B2 | 10/2006 | Jammes et al. |
| 7,526,413 | B2 | 4/2009 | Dahlberg |
| 7,649,169 | B2 | 1/2010 | Guo |
| 7,814,036 | B2 | 10/2010 | Chen et al. |
| 7,876,941 | B2 * | 1/2011 | Panin .............. G01T 1/1644 382/128 |
| 7,912,648 | B2 | 3/2011 | Tang et al. |
| 8,126,647 | B2 | 2/2012 | Hruska et al. |
| 8,126,648 | B2 | 2/2012 | Saltzer et al. |
| 8,705,043 | B2 * | 4/2014 | Lee .............. G01B 11/0608 356/457 |
| 2010/0025109 | A1 | 2/2010 | Deo |
| 2012/0084009 | A1 | 4/2012 | Peyaud et al. |
| 2013/0253835 | A1 | 9/2013 | Whetton et al. |
| 2014/0254884 | A1 | 9/2014 | Elkington et al. |
| 2014/0286539 | A1 | 9/2014 | Shetty et al. |

OTHER PUBLICATIONS

Examination Report in counterpart Australian Application No. 2016203126 dated Aug. 4, 2017, 11 Pages.

Office Action in counterpart Canadian Application No. 2,929,743 dated Feb. 17, 2017, 4 Pages.

Heidari, Zoya et al., "Inversion-based detection of bed boundaries for petrophysical evaluation with well logs: Applications to carbonate and organic-shale formations", Technical paper, Interpretation, Aug. 2014, pp. T129-T142, http://library.seg.org/.

Al-Khayyal, Faiz A. et al., "Jointly Constrained Biconvex Programming", Mathematics of Operations Research, vol. 8, No. 2, May 1983, The Institute of Management Sciences.

Sherali, Hanif D. et al., "A New Reformulation-Linearization Technique for Bilinear Programming Problems", Journal of Global Optimization, 2: 379-410, (1992), Kluwer Academic Publishers.

Konno, Hiroshi, "A Cutting Plane Algorithm for Solving Bilinear Programs", Mathematical Programming 11 (1976) 14-27, North-Holland Publishing Company.

Al-Khayyal, F. A., "Jointly Constrained Bilinear Programs and Related Problems: An Overview", Computers Math. Applic. vol. 19., No. 11, pp. 53-62 (1990), Pergamon Press plc.

Second Office Action in counterpart Canadian Application No. 2,929,743 dated Jan. 30, 2017, 4 Pages.

* cited by examiner

SYSTEM AND METHOD FOR JOINT INVERSION OF BED BOUNDARIES AND PETROPHYSICAL PROPERTIES FROM BOREHOLE LOGS

TECHNICAL FIELD

This disclosure relates generally to the field of joint inversion of bed boundaries and petrophysical properties for the evaluation of wellbores from borehole logs and in particular to methods and systems for optimization of bed boundary and petrophysical property evaluations from borehole logs.

BACKGROUND

It is well known that petrophysical, compositional and geological evaluation of formations from which commodities from beneath the ground are desired to be extracted is a very important task. This is desirable partly so that an assessment can be made of the quantity and quality, and hence the value, of the materials in question; and also because it is important to know whether the extraction of such materials is likely to be problematic.

It is also well known that shoulder beds can have a large impact on estimates of petrophysical and compositional properties of formations. This is particularly true for thinly bedded formations. For example, it has been shown that shoulder-bed effects can cause errors in estimates of porosity, permeability and fluid concentrations in thin beds. Contrast in physical properties of adjacent beds is one of the most important shoulder-bed factors affecting formations. As such, it is important to accurately detect bed boundaries and intelligently account for inherent errors in any such detected bed boundaries.

Detection of bed boundaries can be done by evaluation of wellbore logs. In particular, wellbore image logs and core logs have been used in the past to help in detecting bed boundaries.

One of the techniques used commonly to compute petrophysical properties from logs is known as inversion. In this technique, certain data that may pertain to a log is used to predict the petrophysical properties of earth formations by taking account of known response characteristics of the logging tool.

Though various techniques have been used in the past for the inversion of petrophysical properties from wellbore logs, many of these techniques lack the level of accuracy desired, particularly when the beds are thinner than the innate resolution of the logs and do not provide adequate means for analyzing the associated inversion uncertainty. The following disclosure addresses these and other issues.

SUMMARY

In one embodiment a non-transitory program storage device, readable by a processor is provided. The non-transitory program storage device includes instructions stored thereon to cause one or more processors to receive data from at least one wellbore log measured over a bedded formation; to calculate at least one axial response function (ARF) for each of the at least one wellbore logs; to estimate initial measurements for one or more bed boundary locations; to calculate a maximum bed boundary correction margin; to calculate an optimized bed boundary location for each of the calculated one or more initial measurements; and to calculate optimized petrophysical property values for each of the one or more optimized bed boundary locations. The calculations of optimized bed boundary locations and optimized petrophysical property values are done by solving a constrained optimization problem based on the received data and the maximum bed boundary correction margin.

In another embodiment, a method for bed boundary measurement correction and petrophysical property prediction is provided. The method includes receiving data from at least one wellbore log measured over a bedded formation; calculating at least one axial response function (ARF) for each of the at least one wellbore logs; estimating initial measurements for one or more bed boundary locations; calculating a maximum bed boundary correction margin; to calculate an optimized bed boundary location for each of the calculated one or more initial measurements; and calculating optimized petrophysical property values for each of the one or more optimized bed boundary locations. The calculations of optimized bed boundary locations and optimized petrophysical property values are done by solving a constrained optimization problem based on the received data and the maximum bed boundary correction margin.

In yet another embodiment, a system is provided. The system includes, in one embodiment, a memory, a display device, and a processor operatively coupled to the memory and the display device and adapted to execute program code stored in the memory. The program code is executed to receive data from at least one wellbore log measured over a bedded formation; to calculate at least one axial response function (ARF) for each of the at least one wellbore logs; to estimate initial measurements for one or more bed boundary locations; to calculate a maximum bed boundary correction margin; to calculate an optimized bed boundary location for each of the calculated one or more initial measurements; and to calculate optimized petrophysical property values for each of the one or more optimized bed boundary locations. The calculations of optimized bed boundary locations and optimized petrophysical property values are done by solving a constrained optimization problem based on the received data and the maximum bed boundary correction margin.

DESCRIPTION OF DISCLOSED EMBODIMENTS

In the following description, for purposes of explanation, numerous specific details are set forth in order to provide a thorough understanding of the inventive concept. As part of this description, some of this disclosure's drawings represent structures and devices in block diagram form in order to avoid obscuring the invention. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of data processing having the benefit of this disclosure.

Correct detection of bed boundary positions is important to different types of evaluations of formations. Bed boundaries can be detected by using wellbore logs and utilized for constraining inversion techniques to perform petrophysical property predictions. However, the accuracy of most of the commonly used inversion techniques depends on the thickness of each bed. Accuracy is particularly decreased when a bed thickness is below the resolution of the wellbore logs used in the inversion of petrophysical properties. To increase accuracy, a process can be used in which a high resolution wellbore log is used to get an initial estimate of boundary positions. The initial estimate is then refined by a joint optimization of boundary positions and bed property values. Such a process automates both the generation of a single set of boundaries that are common to all measurements and the prediction of petrophysical properties via joint inversion.

In general, a first step in bed boundary correction and petrophysical property prediction is obtaining data from one or more wellbore logs. Different logging techniques can be used for this purpose. In general, most logging techniques exploit physical and chemical properties of a formation usually through the use of a logging tool or sonde that is lowered into a borehole formed in the formation by drilling. In most cases, the tool sends energy into the formation and detects the energy returned to it that has been altered in some way by the formation. The nature of any such alteration can be processed into signals that are then used to generate the wellbore logs.

Figure 1:
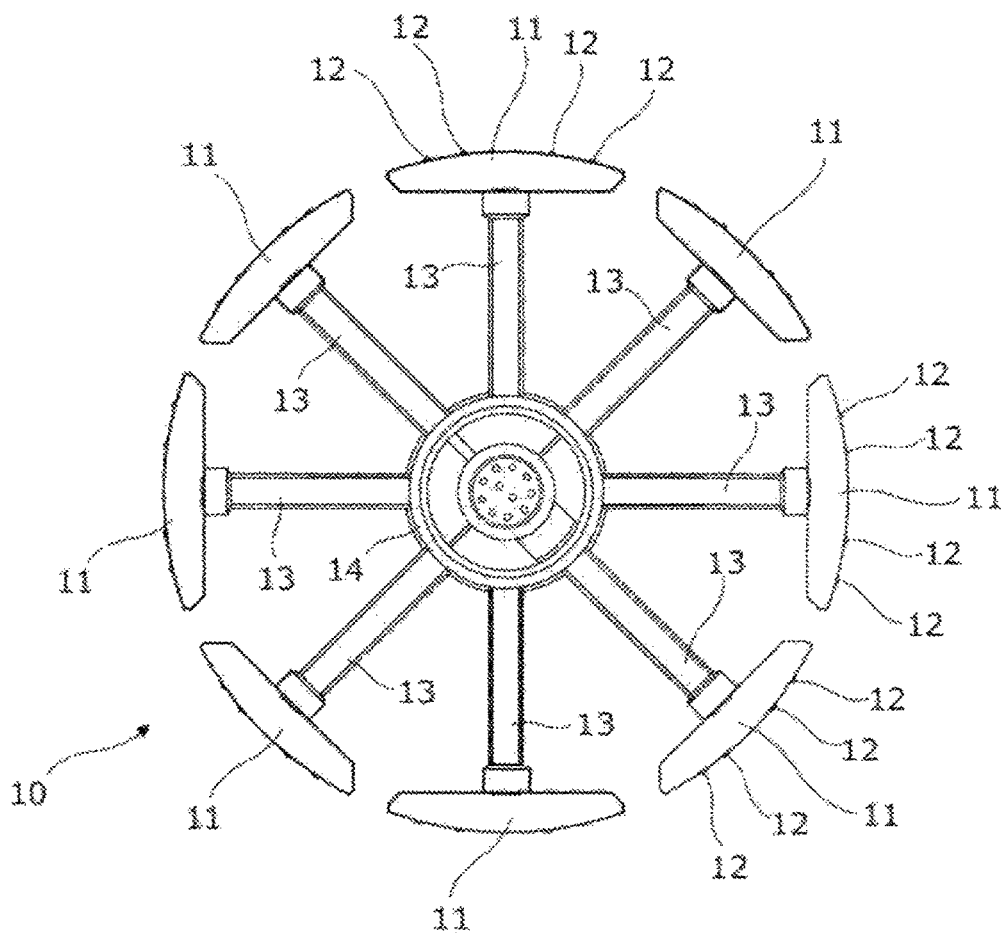
FIG. 1 shows an example of wellbore image logging tool, according to one or more disclosed embodiments.

FIG. 1 shows an example of a logging tool referred to as a multi-pad micro-resistivity borehole imaging tool in transversely sectioned view. In this logging tool 10, a circular array of eight pads is supported on a series of caliper arms 13 emanating from a central cylinder 14. Typically, each of the eight pads 11 support two lines of surface-mounted resistivity electrodes referred to as "buttons" 12. During use of the tool 10, the arms 13 press the buttons 12 into contact with the approximately cylindrical wall of a borehole. The borehole is normally filled with a fluid that if conductive provides an electrical conduction path from the formation surrounding the borehole to the buttons.

It should be noted that the tool 10 is just one example of an imaging tool that can be used. There are many other known imaging tools that can be used. For example, in some imaging tools the numbers and patterns of the buttons 12 may vary and the support arms also may be of differing designs in order to achieve particular performance effects. Sometimes the designers of the tools aim to create multiple parallel rows of buttons located on the pad one above the other in use. Another type of resistivity logging tool is one that is employed during logging while drilling (LWD) operations. This type of logging tool may include only a single button.

In general, in operation of a tool such as resistivity tool 10, electrical current generated by electronic components contained within the cylinder 14 spreads into the rock and passes through it before returning to the cylinder 14. The returning current induces electrical signals in the buttons 12. Changes in the current after passing through the rock may be used to generate measures of the resistivity or conductivity of the rock. The resistivity data may be processed according to known techniques in order to create image logs that reflect the composition of the solid and fluid parts of the rock. These image logs can then be used to constrain the joint inversion of bed boundary positions and petrophysical properties. In addition to image logs, other types of wellbore logs can be used to obtain the data necessary for bed boundary correction and petrophysical property prediction. In general any petrophysical log whose behavior can be described by the convolution of an ARF with a geological bed sequence can be used. For example, density, porosity, gamma ray, spectral gamma ray, photoelectric absorption factor (PEF), elemental composition, neutron capture cross section, and acoustic velocity logs may also be used. In one embodiment, each measured input log corresponds to one petrophysical property of interest. As such the petrophysical properties predicted may also include density, porosity, gamma ray, spectral gamma ray, photoelectric absorption factor (PEF), elemental composition, neutron capture cross section, and acoustic velocity.

Figure 2:
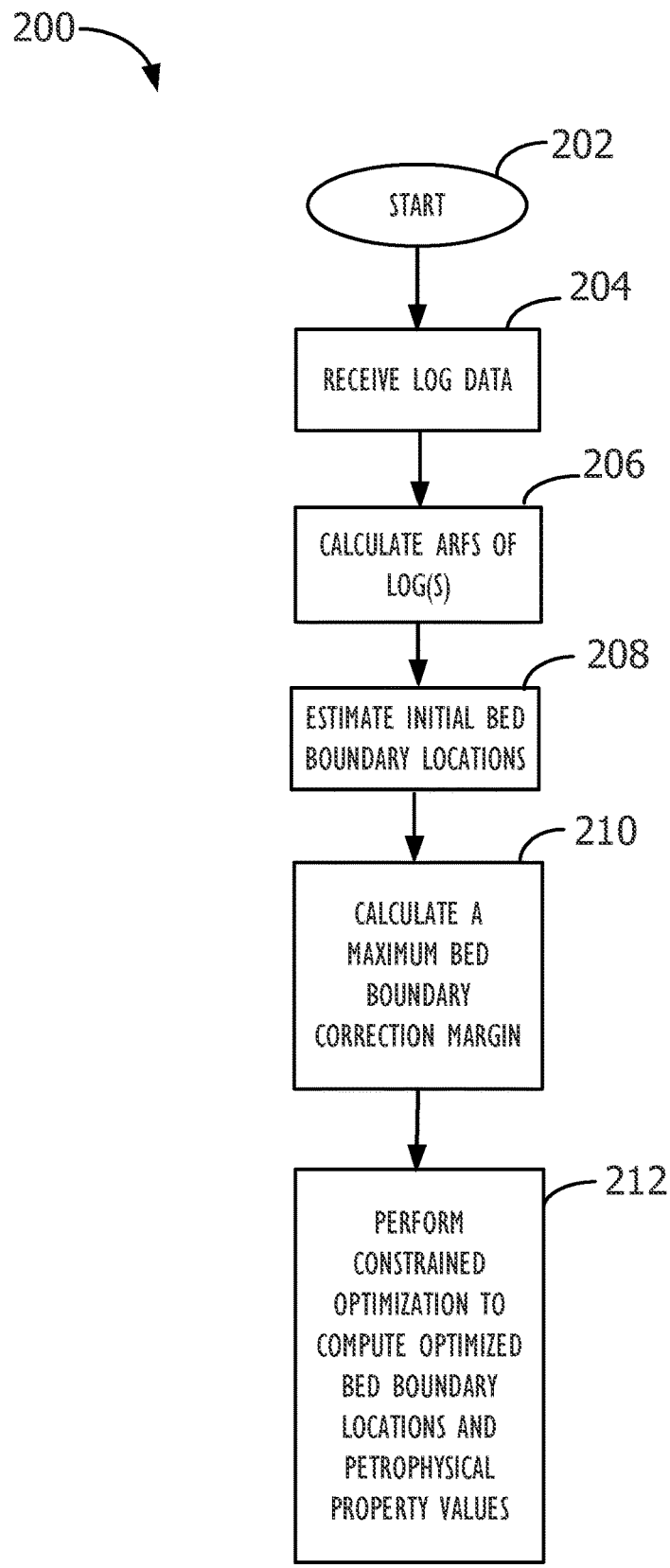
FIG. 2 shows a flowchart for an optimized bed boundary correction and petrophysical property prediction operation, according to one or more disclosed embodiments.

FIG. 2 provides a flow chart for a bed boundary correction and petrophysical property prediction operation, according to one embodiment. Operation 200 starts (block 202) by receiving wellbore log data (block 204) from one or more sources. As discussed above, these sources may include high resolution image logs, density, PEF or nuclear logs. Once received, a discrete axial response function (ARF) may be calculated for one or more of the received logs (block 206). Generally speaking, the response function of a logging measurement represents its sensitivity to an attribute or property of a geological formation over a certain distance corresponding to the resolution of the tool used for logging. Thus, the response function can be used to assist in interpretation of log data because it indicates the accuracy with which the logging tool can be expected to identify specific features in a particular type of formation. Moreover, a logging process can generally be formulated as the result of the convolution of the underlying geological signal with a respective ARF when the geological signal does not vary radially.

Once ARFs of the one or more wellbore logs have been computed, the operation estimates initial bed boundary locations (block 208). Various approaches can be taken to estimate the initial boundary positions. For example, in one approach initial estimates may be made based on image logs. In an alternative approach, an initial guess may be made based on manual detection of bed boundaries using available wellbore logs. Another approach may involve making the initial estimate based on inflection points of density or PEF logs. In instances of sub-resolution beds, one approach is to use an independent source of high resolution information, such as micro-resistivity images. Since it is well known that the initial estimate is within a margin of error from the actual bed boundary locations, a maximum bed boundary correction margin is calculated (block 210), at this point. The initial estimate and the correction margin are then both used to perform a constrained optimization process (block 212)

that ultimately calculates optimized bed boundary corrections and petrophysical property values.

In one embodiment, the step of calculating the ARFs in the operation 200 may be simplified by pre-computing the ARFs using a Monte Carlo N-Particle Transport Code (MCNP) simulation. As a result, the bed response for a given measurement can be formulated as the following discrete convolution:

$$(w_i * ARF)(d) = \sum_{\tau=-\infty}^{\infty} w_i(\tau) ARF(d-\tau) \quad (1)$$

Where d and $\tau$ designate depth values, $w_i(.)$ is a unit-height top-hat function of the $i^{th}$ bed, and ARF(.) is the discrete axial response function.

The simulated discrete ARF curve may be fitted by a continuous ARF model. For simplicity, this continuous ARF model is also labeled ARF(.) in this document and all subsequent references to ARF(.) will refer to the continuous ARF model.

The continuous form of ARF may be used, in one embodiment, to derive a concise closed-form expression for the bed response. In one embodiment, it is assumed that the discrete ARF(.) function is sampled with a constant spatial resolution $\Delta$. This constant spatial resolution can then be introduced into the summand of equation (1), as shown, below before ultimately arriving at a concise closed-form expression for the bed response.

$$(w_i * ARF)(d) = \frac{1}{\Delta} \sum_{\tau=-\infty}^{\infty} w_i(\tau) ARF(d-\tau) \Delta \quad (2)$$

An integral representation can then be used as a continuous approximation to the above sum to write the bed response at a depth d as:

$$(w_i * ARF)(d) \approx \frac{1}{\Delta} \int_{-\infty}^{\infty} w_i(\tau) ARF(d-\tau) d\tau \quad (3)$$

Assuming that the unit-height function $w_i(.)$ is non-zero over an arbitrary bed boundary range of $[b_i, b_{i+1}]$ and zero elsewhere, equation (3) can then be written as:

$$(w_i * ARF)(d) \approx \frac{1}{\Delta} \int_{b_i}^{b_{i+1}} ARF(d-\tau) d\tau \quad (4)$$

By letting $x=(d-\tau)$, $d\tau$ can be written as $-dx$ and the integration limits of x will be $d-b_{i+1}$ and $d-b_i$. Thus the bed response at a depth of d can be written as:

$$(w_i * ARF)(d) \approx \frac{1}{\Delta} \int_{d-b_{i+1}}^{d-b_i} ARF(x) dx \quad (5)$$

By presumption of continuity, ARF(.) admits an anti-derivative function which can be denoted by IARF(.) yielding:

$$(w_i * ARF)(d) \approx \frac{1}{\Delta} (IARF(d-b_i) - IARF(d-b_{i+1})) \quad (6)$$

In one embodiment, for simplicity and without a loss of generality, the remaining steps of derivation of the inversion problem will presume density as the underlying petrophysical property of interest. However, other petrophysical properties or a combination of one or more petrophysical properties can be used in other embodiments.

Letting $\rho_i$ denote the density value of the $i^{th}$ bed, the density log value of the $i^{th}$ bed at a depth d would be given by scaling the result of the convolution by a factor of $\rho_i$ resulting in the following equation:

$$\frac{1}{\Delta} (IARF(d-b_i) - IARF(d-b_{i+1})) \rho_i \quad (7)$$

Thus, summing over all existing n beds, the simulated log value at a depth d may be given by:

$$\frac{1}{\Delta} \sum_{i=1}^{n} (IARF(d-b_i) - IARF(d-b_{i+1})) \rho_i \quad (8)$$

If we denote m as the measured density log and $m_d$ the measured density log value at a depth d within a set of sampled depths D, then the first norm of the difference between the simulated log and the measured log may be given by the following equation:

$$\sum_{d \in D} \left| m_d - \frac{1}{\Delta} \sum_{i=1}^{n} (IARF(d-b_i) - IARF(d-b_{i+1})) \rho_i \right| \quad (9)$$

Equation (9) can be thought of as an objective function in terms of all bed values: $\{\rho_i\}_{i=1 \ldots n}$ and all bed boundaries: $\{b_i\}_{i=1 \ldots n+1}$. This objective function may be denoted as $f(b, \rho)$ with $b=(b_i)_{i=1 \ldots n+1}$ and $\rho=(\rho_i)_{i=1 \ldots n}$. The problem can then be solved by performing a constrained optimization. This may be done by seeking to find optimal vectors $b^*$ and $\rho^*$ which minimize f. In one embodiment, this is the first norm of the difference between the simulated and observed logs subject to a number of constraints. The constraint set could vary in different embodiments. In one embodiment, one of the constraints is that all optimal bed values must satisfy a lower and an upper bound. Thus $\rho_{min} \leq \rho_i \leq \rho_{max}$ $\forall i=1 \ldots n$ where $\rho_{min}$ and $\rho_{max}$ are known apriori.

Another possible constraint used may be that all optimal bed boundaries must be within a threshold distance to actual boundary measurements. Thus, if $b^0=(b_i^0)_{i=1 \ldots n+1}$ denotes the actual measured bed boundaries, then $\|b-b^0\|_\infty \leq \gamma$ where $\|.\|_\infty$ denotes the maximum norm function and $\gamma$ is the maximum cumulative measurement uncertainty due to the combined effect of measurement noise and measurement offset related to dip position relative to the measurement tool.

Another constraint may be a requirement that the maximum tool measurement offset be constant for all boundaries. Assuming that $\gamma$ denotes the maximum measurement noise, then this constraint implies:

$$\|(b_i - b_i^0) - s\| \leq \delta \forall i=1 \ldots n+1 \text{ and for some shift offset}$$
$$s \in [-(\gamma-\delta), (\gamma-\delta)] \quad (10)$$

In one embodiment, another constraint may be that the sequence of obtained bed boundaries should maintain the original bed sequence order. That is $b_i \leq b_j \forall 1 \leq i < j \leq n+1$. One other constraint that may be used is that all generated bed thicknesses should be within a maximum relative difference threshold $\tau \in (0,1)$, with respect to the original thicknesses. That is $(1-\tau)(b_{i+1}-b_i) \leq b_{i+1}^0 - b_i^0 \leq (1+\tau)(b_{i+1}-b_i) \forall i=1 \ldots n$.

Taking these constrains into account, computing the optimal parameters defining the simulated log can be reduced to the following constrained optimization problem:

$$(b^*, \rho^*, s^*) = \underset{b,\rho,s}{\arg\min} f(b, \rho) \quad (11)$$

$$\text{subject to} \begin{cases} \rho_{min} \leq \rho_i \leq \rho_{max} \forall\, i = 1 \ldots n & (12) \\ \|b - b^0\|_\infty \leq \gamma \\ |(b_i - b_i^0) - s| \leq \delta \forall\, i = 1 \ldots n+1 \text{ and} \\ \text{for some shift offset } s \in [-(\gamma - \delta), (\gamma - \delta)] \\ b_i \leq b_j \forall\, 1 \leq i < j \leq n+1 \\ (1 - \tau)(b_{i+1} - b_i) \leq b_{i+1}^0 - b_i^0 \leq \\ (1 + \tau)(b_{i+1} - b_i) \forall\, i = 1 \ldots n \end{cases}$$

$$\text{where} \begin{cases} b^0 = (b_i^0)_{i=1 \ldots n+1} & (13) \\ b = (b_i)_{i=1 \ldots n+1} \\ \rho = (\rho_i)_{i=1 \ldots n} \\ f(b, \rho) = \sum_{d \in D} \left| m_d - \frac{1}{\Delta} \sum_{i=1}^n \binom{IARF(d-b_i) -}{IARF(d-b_{i+1})} \rho_i \right| \end{cases}$$

In this manner, bed boundaries and property values can be computed using constrained joint optimization which produces more accurate and efficient results than with the fixed initially estimated boundaries. Because IARF(.) may be a nonlinear function, the above optimization problem is generally a nonlinear constrained optimization problem and can therefore be solved using any of the nonlinear optimization methods known in the art.

Though generally more accurate over currently used methods of petrophysical property prediction, the optimization calculation operation 200 can be further improved. That is because due to nonlinearity, the operation may only yield locally optimal solutions. As is well known in the art, locally optimal solutions may be suboptimal and inferior to globally optimal solutions. This can be avoided by using a two-stage approximation scheme which yields a formulation that is much more adequately solvable. This is shown in the flow chart of FIG. 3.

Figure 3:
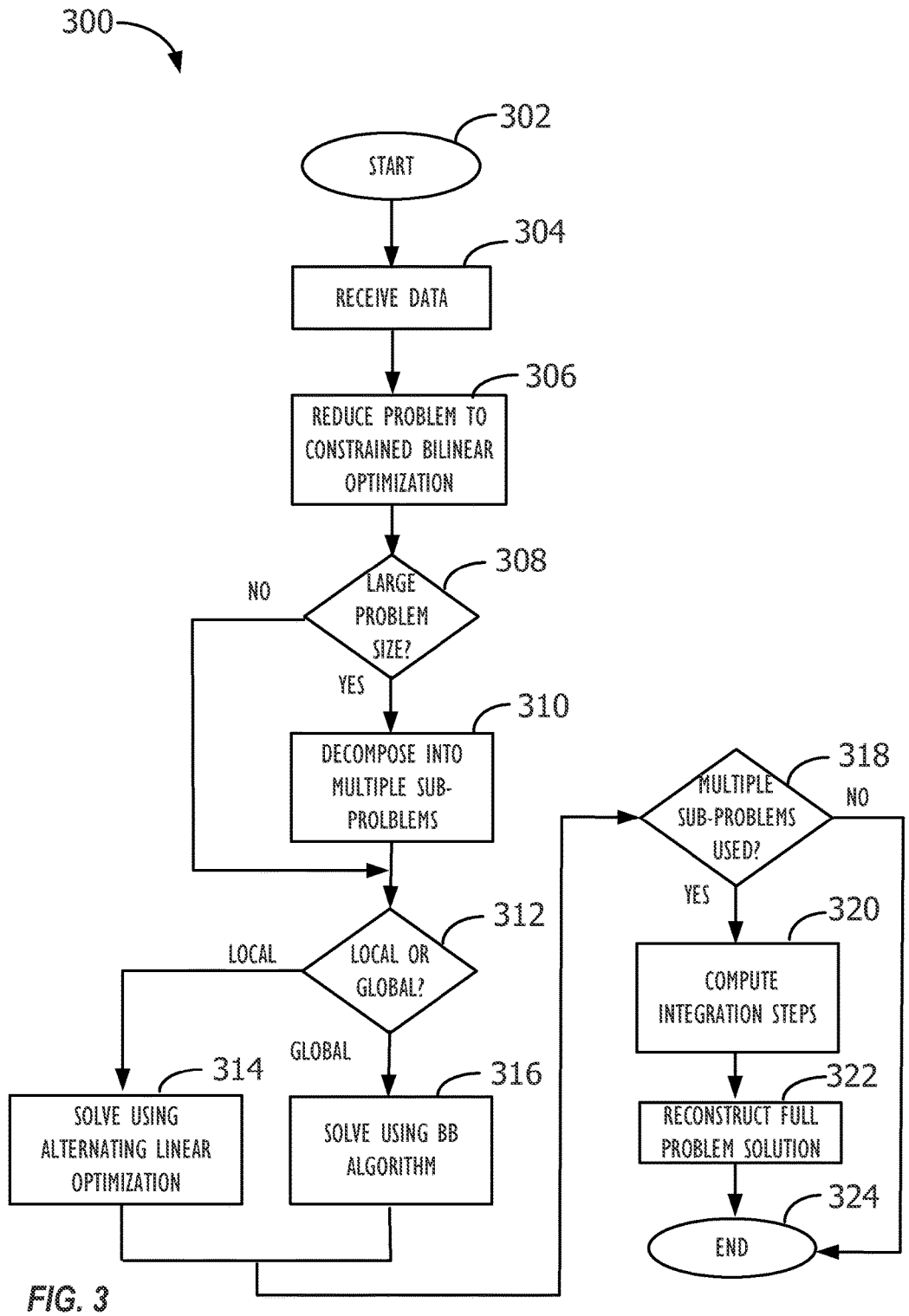
FIG. 3 shows a flowchart for a particular implementation of the optimized bed boundary and property prediction evaluation operation of FIG. 2, according to one or more disclosed embodiments.

Operation 300 of FIG. 3 starts (block 302), in one embodiment, by receiving data (block 304). This data generally includes data received and calculated during steps of operation 200. In particular, the data may include one or more of wellbore log data, ARFs of the wellbore log data, initial estimates of bed boundary locations, and maximum bed boundary correction margin. Alternatively, operation 300 may only receive wellbore log data and may itself perform the steps necessary to calculate ARFs of the wellbore log data, initial estimates of bed boundary locations, and maximum bed boundary correction margin. Once all the necessary data has been received and/or calculated, operation 300 proceeds to reduce the constrained optimization problem of operation 200 to a bilinear optimization problem (block 306). As discussed below in detail, this may be achieved via a Taylor series representation.

When the problem size is large, it may be advantageous to decompose the problem into smaller sub-parts. Accordingly, a determination is made at this point as to whether the size of the problem is large (block 308). This may be done by comparing the problem size to pre-determined threshold values. Alternatively, it may be done by comparing the problem size to input values received from a user. Other configurations are also possible. If the problem size is determined to be large, then the operation proceeds to decompose the problem into multiple sub-problems (810). When operation 300 determines that the problem size is not large, the operation skips the step of decomposing the problem into multiple sub-problems by going directly to the next block.

In one embodiment, the bilinear problem may be solved with a locally optimal solution. Alternatively, it can be made to achieve global optimality by using a linear relaxation process which is guided via by a branch-and-bound strategy. Thus, at this stage, a decision is made as to whether the problem should be solved in a locally or globally optimal fashion (block 312). When it is decided that it may be solved in a locally optimal way, the bilinear problem is solved using alternating linear optimization (block 314), as discussed below. When it is decided that the bilinear problem should be solved with global optimality guarantees, operation 300 may proceed to relax the bilinear problem into a constrained linear optimization problem (block 316) that is then exploited by a branch-and-bound (BB) algorithm able to achieve global optimization of the original bilinear problem.

At this stage, operation 300 determines if the problem was decomposed into multiple sub-problems at block 308 (block 318). This is done because in instances where multiple sub-problems are used, additional steps are required to obtain the desired results. Accordingly, when it is determined that multiple sub-problems were used, operation 300 proceeds to compute integration steps (block 320) before reconstructing the full problem solution (block 322). When it is determined that multiple sub-problems were not used (block 318), or after the full problem solution is reconstructed (block 322), operation 300 proceeds to end (block 324).

Details of how the various problems of operation 300 are solved are discussed below.

Bilinear Approximation

It is well known in the art that global optimality can be achieved for bilinear optimization problems. There are various procedures that achieve globally optimal solutions or near-globally optimal solutions to bilinear programming problems. Some of these procedures are based on approaches such as cutting plane methods or reformulation-linearization techniques. An example of a cutting plane method is discussed in Konno H., "A Cutting Plane Algorithm for Solving Bilinear Programs", Mathematical Programming, Volume 11m Issue 1, pp. 14-27 (1976). An example of a reformulation-linearization technique is disclosed in Sherali H. and Alameddine A., "A New Reformulation-Linearization Technique for Bilinear Programming Problems", Journal of Global Optimization, Volume 2, Issue 4, pp. 379-410 (1992).

To this end, an additive measurement error vector can be introduced which satisfies $b = b^0 + h$ where $h = (h_i)_{i=1 \ldots n+1}$. A minimal reflection reveals that $\|h\|_\infty \leq \gamma$ using the measurement constraint introduced earlier. Furthermore, $IARF(d - b_{i+1}) = IARF(d - b_{i+1}^0 - h_{i+1})$ and $IARF(d - b_i) = IARF(d - b_i^0 - h_i)$ can be expressed in terms of their Taylor series expansion around $d - b_{i+1}^0$ and $d - b_i^0$, respectively. Assuming that IARF(.) is infinitely differentiable and that there exists a minimal series order p such that the associated Taylor series provides a sufficient approximation of IARF(.) locally within a vicinity of $\gamma$ at all possible points $d - b_{i+1}^0$ and $d - b_i^0$, then the total absolute difference expression becomes:

$$\sum_{d \in D} \left| m_d - \frac{1}{\Delta} \sum_{i=1}^n \left( \sum_{k=0}^p \frac{IARF^{(k)}(d - b_i^0)}{k!} (-h_i)^k - \right. \right. \quad (14)$$

-continued $$\sum\nolimits_{k=0}^{P} \frac{IARF^{(k)}(d - b_{i+1}^0)}{k!}(-h_{i+1})^k \Big) \rho_i \Big|$$

Which may be further expressed as follows:

$$\sum\nolimits_{d \in D} \Big| m_d - \frac{1}{\Delta} \sum\nolimits_{i=1}^{n} \Big( \sum\nolimits_{k=0}^{P} \Big[ \frac{(-1)^k IARF^{(k)}(d - b_i^0)}{k!}(h_i)^k - \frac{(-1)^k IARF^{(k)}(d - b_{i+1}^0)}{k!}(h_{i+1})^k \Big] \Big) \rho_i \Big| \quad (15)$$

With this approximation, the $IARF^{(k)}(.)$ models need only be evaluated at $(d-b_i^0)$ $\forall i,d,k$ which can be pre-computed prior to the optimization.

An arbitrary boundary vector is thus uniquely characterized in terms of the choice of the h vector and the above optimization problem is therefore equivalent to:

$$\operatorname*{argmin}_{h,\rho} \sum\nolimits_{d \in D} \Big| m_d - \frac{1}{\Delta} \sum\nolimits_{i=1}^{n} \Big( \sum\nolimits_{k=0}^{P} \Big[ \frac{(-1)^k IARF^{(k)}(d - b_i^0)}{k!}(h_i)^k - \frac{(-1)^k IARF^{(k)}(d - b_{i+1}^0)}{k!}(h_{i+1})^k \Big] \Big) \rho_i \Big| \quad (16)$$

subject to
$$\begin{cases} \rho_{min} \le \rho_i \le \rho_{max} \forall i = 1 \ldots n \\ -\gamma \le h_i \le \gamma \forall i = 1 \ldots n+1 \\ |(b_i - b_i^0) - s| \le \delta \forall i = 1 \ldots n+1 \text{ and} \\ \text{for some shift offset } s \in [-(\gamma - \delta), (\gamma - \delta)] \\ b_i^0 + h_i \le b_j^0 + h_j \forall 1 \le i < j \le n+1 \\ (1-\tau)(b_{i+1}^0 - h_{i+1} - b_i^0 - h_i) \le b_{i+1}^0 - b_i^0 \le \\ (1+\tau)(b_{i+1}^0 + h_{i+1} - b_i^0 - h_i) \forall i = 1 \ldots n \end{cases} \quad (17)$$

Introducing slack variables, the problem can be equivalently re-expressed as follows:

$$\operatorname*{argmin}_{h,\rho,\varepsilon} \sum\nolimits_{d \in D} \varepsilon_d \quad (18)$$

subject to (19)

$$\begin{cases} \varepsilon_d \Big| m_d - \frac{1}{\Delta} \sum\nolimits_{i=1}^{n} \Big( \sum\nolimits_{k=0}^{P} \Big[ \frac{(-1)^k IARF^{(k)}(d - b_i^0)}{k!}(h_i)^k - \frac{(-1)^k IARF^{(k)}(d - b_{i+1}^0)}{k!}(h_{i+1})^k \Big] \Big) \rho_i \Big| \\ \rho_{min} \le \rho_i \le \rho_{max} \forall i = 1 \ldots n \\ -\gamma \le h_i \le \gamma \forall i = 1 \ldots n+1 \\ |(b_i - b_i^0) - s| \le \delta \forall i = 1 \ldots n+1 \text{ and} \\ \text{for some shift offset } s \in [-(\gamma - \delta), (\gamma - \delta)] \\ b_i^0 + h_i \le b_j^0 + h_j \forall 1 \le i < j \le n+1 \\ (1-\tau)(b_{i+1}^0 - h_{i+1} - b_i^0 - h_i) \le b_{i+1}^0 - b_i^0 \le \\ (1+\tau)(b_{i+1}^0 + h_{i+1} - b_i^0 - h_i) \forall i = 1 \ldots n \end{cases}$$

Writing the equation constraint as a double inequality results in:

$$-\varepsilon_d \le m_d - \frac{1}{\Delta} \sum\nolimits_{i=1}^{n} \Big( \sum\nolimits_{k=0}^{P} \Big[ \frac{(-1)^k IARF^{(k)}(d - b_i^0)}{k!}(h_i)^k - \frac{(-1)^k IARF^{(k)}(d - b_{i+1}^0)}{k!}(h_{i+1})^k \Big] \Big) \rho_i \le \varepsilon_d \quad (20)$$

Moreover, the above summand expression can be developed as follows:

$$\sum\nolimits_{i=1}^{n} \Big( \sum\nolimits_{k=0}^{P} \Big[ \frac{(-1)^k IARF^{(k)}(d - b_i^0)}{k!}(h_i)^k - \frac{(-1)^k IARF^{(k)}(d - b_{i+1}^0)}{k!}(h_{i+1})^k \Big] \Big) \rho_i = \quad (21)$$

$$\sum\nolimits_{i=1}^{n} \Big( IARF(d - b_i^0) - IARF(d - b_{i+1}^0) + \sum\nolimits_{k=1}^{P} \Big[ \frac{(-1)^k IARF^{(k)}(d - b_i^0)}{k!}(h_i)^k - \frac{(-1)^k IARF^{(k)}(d - b_{i+1}^0)}{k!}(h_{i+1})^k \Big] \Big) \rho_i =$$

$$\sum\nolimits_{i=1}^{n} \Big( [IARF(d - b_i^0) - IARF(d - b_{i+1}^0)] \rho_i + \sum\nolimits_{k=1}^{P} \Big[ \frac{(-1)^k IARF^{(k)}(d - b_i^0)}{k!} \rho_i(h_i)^k - \frac{(-1)^k IARF^{(k)}(d - b_{i+1}^0)}{k!} \rho_i(h_{i+1})^k \Big] \Big)$$

For concision, in one embodiment, the following new labels may be introduced:

$$\theta_i = IARF(d - b_i^0) - IARF(d - b_{i+1}^0) \forall i = 1 \ldots n \quad (22)$$

And $$\omega_{i,k} = \frac{(-1)^k IARF^{(k)}(d - b_i^0)}{k!} \forall i = 1 \ldots n, k = 1 \ldots p \quad (23)$$

As a result, the summand development culminates in:

$$\Sigma_{i=1}^{n}[\theta_i \rho_i + \Sigma_{k=1}^{P}[\omega_{i,k} \rho_i(h_i)^k - \omega_{i+1,k} \rho_i(h_{i+1})^k]] \quad (24)$$

Therefore the double inequality associated with the original equivalent expression to the above becomes:

$$-\varepsilon_d \le \quad (25)$$

$$m_d - \frac{1}{\Delta} \sum\nolimits_{i=1}^{n} \Big[ \theta_i \rho_i + \sum\nolimits_{k=1}^{P} [\omega_{i,k} \rho_i(h_i)^k - \omega_{i+1,k} \rho_i(h_{i+1})^k] \Big] \le \varepsilon_d$$

The constraints involving the monomials $\rho_i(h_i)^k$ and $\rho_i(h_{i+1})^k$ may be conveniently simplified by employing suitable variable substitutions and introducing appropriate additional constraints. In particular, letting $\alpha_{i,k}=\rho_i(h_i)^k$ $\forall i=1 \ldots n, k=1 \ldots p$ and $\beta_{i,k}=\rho_i(h_{i+1})^k$ $\forall i=1 \ldots n, k=1 \ldots p$, the following are then equivalent recursively defined equations that may serve as surrogates to the above original definitions.

$$\begin{cases} \alpha_{i,1} = \rho_i h_i \, \forall \, i = 1 \ldots n \\ \beta_{i,1} = \rho_i h_{i+1} \, \forall \, i = 1 \ldots n \\ \alpha_{i,k} = \alpha_{i,k-1} h_i \, \forall \, i = 1 \ldots n, k = 2 \ldots p \\ \beta_{i,k} = \beta_{i,k-1} h_{i+1} \, \forall \, i = 1 \ldots n, k = 2 \ldots p \end{cases}$$

Using the above equivalencies, the original double inequality therefore becomes:

$$-\varepsilon_d \le m_d - \frac{1}{\Delta} \sum_{i=1}^n \left[ \theta_i \rho_i + \sum_{k=1}^p [\omega_{i,k} \alpha_{i,k} - \omega_{i+1,k} \beta_{i,k}] \right] \le \varepsilon_d \quad (26)$$

And the final bilinear optimization problem may be therefore stated as:

$$\operatorname*{argmin}_{h,\rho,\varepsilon,\alpha,\beta} \sum_{d \in D} \varepsilon_d \quad (27)$$

subject to (28)

$$\begin{cases} -\varepsilon_d \le m_d - \frac{1}{\Delta} \sum_{i=1}^n \left[ \theta_i \rho_i + \sum_{k=1}^p [\omega_{i,k} \alpha_{i,k} - \omega_{i+1,k} \beta_{i,k}] \right] \le \varepsilon_d \\ \rho_{min} \le \rho_i \le \rho_{max} \, \forall \, i = 1 \ldots n \\ -\gamma \le h_i \le \gamma \, \forall \, i = 1 \ldots n+1 \\ |(b_i - b_i^0) - s| \le \delta \, \forall \, i = 1 \ldots n+1 \text{ and} \\ \text{for some shift offset } s \in [-(\gamma - \delta), (\gamma - \delta)] \\ b_i^0 + h_i \le b_j^0 + h_j \, \forall \, 1 \le i < j \le n+1 \\ (1-\tau)(b_{i+1}^0 + h_{i+1} - b_i^0 - h_i) \le b_{i+1}^0 - b_i^0 \le \\ (1+\tau)(b_{i+1}^0 + h_{i+1} - b_i^0 - h_i) \, \forall \, i = 1 \ldots n \\ \alpha_{i,1} = \rho_i h_i \, \forall \, i = 1 \ldots n \\ \beta_{i,1} = \rho_i h_{i+1} \, \forall \, i = 1 \ldots n \\ \alpha_{i,k} = \alpha_{i,k-1} h_i \, \forall \, i = 1 \ldots n, k = 2 \ldots p \\ \beta_{i,k} = \beta_{i,k-1} h_{i+1} \, \forall \, i = 1 \ldots n, k = 2 \ldots p \end{cases}$$

Where, (29)

$$\begin{cases} \theta_i = IARF(d - b_i^0) - IARF(d - b_{i+1}^0) \, \forall \, i = 1 \ldots n \\ \omega_{i,k} = \frac{(-1)^k IARF^{(k)}(d - b_i^0)}{k!} \, \forall \, i = 1 \ldots n, k = 1 \ldots p \end{cases}$$

It is the bilinear product terms involved in the equations defining the $\alpha$ and $\beta$ vectors that render the solution space and thus the optimization problem bilinear.

When p=1 the above bilinear program satisfies an interesting property. In particular, under the said circumstance, if the density vector $\rho$ is known, the problem of finding the optimal bed boundary perturbation vector h may be cast as a linear problem. Conversely, knowing h also reduces finding the optimal density vector $\rho$ to solving a linear problem. Assuming an initial estimate for one of the vectors is available, the problem can be solved using an alternating linear optimization procedure wherein the estimate of one vector is used in deriving a new estimate for the second vector and alternation continues until convergence. Since initial bed boundary measurements are available, the vector $b^0$ can serve as an initial estimate for b or equivalently setting the initial h vector to null. Other ways for defining an initial estimate for any of the two vectors may be envisioned.

Because the maximum measurement error $\gamma$ may be too large for the bilinear approximation to hold with p=1, a maximum step size $\gamma_{step}$ for the total perturbation margin can be artificially imposed such that the approximation holds for p=1 within the margin of $\gamma_{step}$. A stepwise alternating procedure is herein applicable by limiting the perturbation to a maximum of $\gamma_{step}$ with respect to the boundaries computed at the previous iteration. In addition to this local (iteration-wise) requirement, the cumulative update to h must still not violate the original constraints.

Because at each iteration the problem is linear, each step can be optimized globally. However, such an iterative process is only theoretically guaranteed to converge to a local optimum, one that is subjective to the initial choice of the one vector estimate. To improve upon this, the procedure is coupled, in one embodiment, with a cutting plane approach to yield a global optimum up to a well-contained error. Alternatively, a Monte-Carlo approach can be used wherein (1) multiple initial estimates are sampled within the hyper-rectangle constraints, (2) each estimate is improved upon locally using the alternating optimization method, and (3) the best local optimum is qualified as the final solution.

As discussed above, instead of solving the bilinear problem with the local optimization (alternating) procedure, a linear relaxation approach in conjunction with a branch-and-bound algorithm may be employed to compute a global optimum as delineated in the next two subsections.

Linear Relaxation

In one embodiment, to linearize the bilinear constraints above, tight convex and concave envelopes may be applied around any bilinear product. For a bilinear term xy wherein $x_l \le x \le x_h$ and $y_l \le y \le y_h$, the tight convex and concave envelopes around xy may be defined as $$\begin{cases} xy \ge \max\{x_l y + y_l x - x_l y_l, x_h y + y_h x - x_h y_h\} \\ xy \le \min\{x_h y + y_l x - x_h y_l, x_l y + y_h x - x_l y_h\} \end{cases} \quad (30)$$

See Al-Khayyal F. A. and Falk, J. E., "Jointly Constrained Biconvex Programming", Mathematics of Operation Research, Volume 8, Issue 2, pp. 273-283 (1983) and Al-Khayyal F. A., "Jointly Constrained Bilinear Programs and Related Problems: An Overview", Computers & Mathematics with Applications, Volume 19, Issue 11, pp. 53-62 (1990) for discussions of convex and concave envelopes. Before being able to construct the linear relaxations on the bilinear terms in the bilinear problem above, their upper and lower bounds should be computed. It is clear that each of the $\alpha$ and $\beta$ vectors satisfy the following hyperrectangle constraints:

$$\alpha_{i,k}{}^l = \beta_{i,k}{}^l = \min(0, \rho_{max}(-\gamma)^k) \le \alpha_{i,k}, \beta_{i,k} \le \rho_{max} \gamma^k = \alpha_{i,k}{}^h = \beta_{i,k}{}^h \, \forall \, i = 1 \ldots n, k = 1 \ldots p \quad (31)$$

Using the above bounds, the recursive definitions of the $\alpha$ and $\beta$ vectors, and recalling that $\rho_{min} \le \rho_i \le \rho_{max} \, \forall i = 1 \ldots n$, it can be verified that the respective envelopes on $\alpha$ and $\beta$ are:

$$\forall \, i = 1 \ldots n, k = 2 \ldots p, \quad (32)$$

$$\begin{cases} \alpha_{i,1} \ge \max\{\rho_{min} h_i - \gamma \rho_i + \rho_{min} \gamma, \rho_{max} h_i + \gamma \rho_i - \rho_{max} \gamma\} \\ \alpha_{i,1} \le \min\{\rho_{max} h_i - \gamma \rho_i + \rho_{max} \gamma, \rho_{min} h_i + \gamma \rho_i - \rho_{min} \gamma\} \\ \alpha_{i,k} \ge \max\begin{Bmatrix} \alpha_{i,k-1}^l h_i - \gamma \alpha_{i,k-1} + \alpha_{i,k-1}^l \gamma, \\ \alpha_{i,k-1}^h h_i + \gamma \alpha_{i,k-1} - \alpha_{i,k-1}^h \gamma \end{Bmatrix} \\ \alpha_{i,k} \le \min\begin{Bmatrix} \alpha_{i,k-1}^h h_i - \gamma \alpha_{i,k-1} + \alpha_{i,k-1}^h \gamma, \\ \alpha_{i,k-1}^l h_i + \gamma \alpha_{i,k-1} - \alpha_{i,k-1}^l \gamma \end{Bmatrix} \end{cases}$$

And

-continued $$\begin{cases} \beta_{i,1} \geq \max\{\rho_{min}h_{i+1} - \gamma\rho_i + \rho_{min}\gamma, \rho_{max}h_{i+1} + \gamma\rho_i - \rho_{max}\gamma\} \\ \beta_{i,1} \leq \min\{\rho_{max}h_{i+1} - \gamma\rho_i + \rho_{max}\gamma, \rho_{min}h_{i+1} + \gamma\rho_i - \rho_{min}\gamma\} \\ \beta_{i,k} \geq \max\begin{cases} \beta_{i,k-1}^l h_{i+1} - \gamma\beta_{i,k-1} + \beta_{i,k-1}^l\gamma, \\ \beta_{i,k-1}^h h_{i+1} + \gamma\beta_{i,k-1} - \beta_{i,k-1}^h\gamma \end{cases} \\ \beta_{i,k} \leq \min\begin{cases} \beta_{i,k-1}^h h_{i+1} - \gamma\beta_{i,k-1} + \beta_{i,k-1}^h\gamma, \\ \beta_{i,k-1}^l h_{i+1} + \gamma\beta_{i,k-1} - \beta_{i,k-1}^l\gamma \end{cases} \end{cases} \quad (33)$$

Gathering all original linear and the linearized constraints, the linearly relaxed constrained optimization problem finally becomes:

$$\operatorname*{argmin}_{h,\rho,\varepsilon,\alpha,\beta} \sum_{d \in D} \varepsilon_d \quad (34)$$

subject to  (35)

$$\begin{cases} -\varepsilon_d \leq m_d - \frac{1}{\Delta}\sum_{i=1}^n \left[\theta_i\rho_i + \sum_{k=1}^p [\omega_{i,k}\alpha_{i,k} - \omega_{i+1,k}\beta_{i,k}]\right] \leq \varepsilon_d \\ \rho_{min} \leq \rho_i \leq \rho_{max} \forall i = 1 \ldots n \\ -\gamma \leq h_i \leq \gamma \forall i = 1 \ldots n+1 \\ |(b_i - b_i^0) - s| \leq \delta \forall i = 1 \ldots n+1 \text{ and} \\ \text{for some shift offset } s \in [-(\gamma - \delta), (\gamma - \delta)] \\ b_i^0 + h_i \leq b_j^0 + h_j \forall 1 \leq i < j \leq n+1 \\ (1-\tau)(b_{i+1}^0 + h_{i+1} - b_i^0 - h_i) \leq b_{i+1}^0 - b_1^0 \leq \\ (1+\tau)(b_{i+1}^0 + h_{i+1} - b_i^0 - h_i) \forall i = 1 \ldots n \\ \begin{cases} \rho_{min}h_i - \gamma\rho_i + \rho_{min}\gamma \\ \rho_{max}h_i + \gamma\rho_i - \rho_{max}\gamma \end{cases} \leq \alpha_{i,1} \leq \begin{cases} \rho_{max}h_i - \gamma\rho_i + \rho_{max}\gamma \\ \rho_{min}h_i + \gamma\rho_i - \rho_{min}\gamma \end{cases} \forall i = 1 \ldots n \\ \forall i = 1 \ldots n, k = 2 \ldots p \\ \begin{cases} \alpha_{i,k-1}^l h_i - \gamma\alpha_{i,k-1} + \alpha_{i,k-1}^l\gamma \\ \alpha_{i,k-1}^h h_i + \gamma\alpha_{i,k-1} - \alpha_{i,k-1}^h\gamma \end{cases} \leq \alpha_{i,k} \leq \begin{cases} \alpha_{i,k-1}^h h_i - \gamma\alpha_{i,k-1} + \alpha_{i,k-1}^h\gamma \\ \alpha_{i,k-1}^l h_i + \gamma\alpha_{i,k-1} - \alpha_{i,k-1}^l\gamma \end{cases} \\ \begin{cases} \rho_{min}h_{i+1} - \gamma\rho_i + \rho_{min}\gamma \\ \rho_{max}h_{i+1} + \gamma\rho_i - \rho_{max}\gamma \end{cases} \leq \beta_{i,1} \leq \\ \begin{cases} \rho_{max}h_{i+1} - \gamma\rho_i + \rho_{max}\gamma \\ \rho_{min}h_{i+1} + \gamma\rho_i - \rho_{min}\gamma \end{cases} \forall i = 1 \ldots n \\ \forall i = 1 \ldots n, k = 2 \ldots p, \\ \begin{cases} \beta_{i,k-1}^l h_{i+1} - \gamma\beta_{i,k-1} + \beta_{i,k-1}^l\gamma \\ \beta_{i,k-1}^h h_{i+1} + \gamma\beta_{i,k-1} - \beta_{i,k-1}^h\gamma \end{cases} \leq \beta_{i,k} \leq \\ \begin{cases} \beta_{i,k-1}^h h_{i+1} - \gamma\beta_{i,k-1} + \beta_{i,k-1}^h\gamma \\ \beta_{i,k-1}^l h_{i+1} + \gamma\beta_{i,k-1} - \beta_{i,k-1}^l\gamma \end{cases} \end{cases}$$

Where, $\theta$, $\omega$, $\alpha^l$, $\alpha^h$, $\beta^l$, and $\beta^h$ are as defined previously.

The above relaxed linear optimization problem can be optimized globally using any of the linear programming methods known in the art. In the next subsection, we show how the solution to the original bilinear problem can be recovered from the solution set of well-defined linearly relaxed problems using a branch-and-bound based algorithmic strategy.

Branch and Bound Based Algorithm

The relaxed linear optimization problem formulated above shares the same objective function as that of the original bilinear problem. However, the relaxed linear optimization problem admits a different solution feasibility space. By virtue of the linear relaxation envelopes, it follows that the original (i.e., bilinear) feasibility space is contained well within the relaxed linear feasibility space. Consequently, the optimized objective value over the relaxed linear space is a lower bound for the optimal objective value over the original bilinear space. Another immediate consequence is that the objective value of the bilinear program evaluated at the optimal density and perturbation vectors over the relaxed linear space is an upper bound for the optimal objective over the bilinear space. Accordingly, a branch and bound scheme can be employed via which the complete relaxed linear space is adaptively partitioned until on any partition either the lower bound is coming sufficiently close to the upper bound or the lower bound is larger than or equal to the upper bound over another partition.

The relaxation is essentially due to deploying the tight convex and concave envelopes on the bilinear equation constraints. Therefore, any discrepancy between the lower and upper bounds is the result of the optimum falling within the relaxation margins of the said envelopes and violating the bilinear equations. Partitioning the feasibility space therefore aims at lessening the gap between the bounds by allowing the envelopes to be tighter around each individual space partition and eventually driving the bounds arbitrarily close to one another by repeatedly reapplying the partitioning (branching) procedure. Multiple branching techniques are known in the art and can be used for this procedure. In one embodiment, a branching strategy similar to the one outlined in (Sherali & Alameddine, 1992) is used based on the equation relaxation errors.

Assuming that $(\tilde{h},\tilde{\rho},\tilde{\varepsilon},\tilde{\alpha},\tilde{\beta})$ is any optimal relaxed solution, the relaxation error with respect to the bilinear-term equation at some fixed index pair (i, k) may be formulated as:

$$R_{i,k}(\tilde{h}, \tilde{\rho}, \tilde{\varepsilon}, \tilde{\alpha}, \tilde{\beta}) = \begin{cases} |\tilde{\alpha}_{i,k} - \tilde{\alpha}_{i,k-1}\tilde{h}_i| + \\ |\tilde{\beta}_{i,k} - \tilde{\beta}_{i,k-1}\tilde{h}_{i+1}| & \text{if } k \neq 1 \\ |\tilde{\alpha}_{i,1} - \tilde{\rho}_i\tilde{h}_i| + |\tilde{\beta}_{i,1} - \tilde{\rho}_i\tilde{h}_{i+1}| & \text{otherwise} \end{cases} \quad (36)$$

The total relaxation error from all equations associated with index i may therefore be expressed as:

$$R_i(\tilde{h},\tilde{\rho},\tilde{\varepsilon},\tilde{\alpha},\tilde{\beta}) = \sum_{k=1}^p R_{i,k}(\tilde{h},\tilde{\rho},\tilde{\varepsilon},\tilde{\alpha},\tilde{\beta}) = |\tilde{\alpha}_{i,1} - \tilde{\rho}_i\tilde{h}_i| + |\tilde{\beta}_{i,1} - \tilde{\rho}_i\tilde{h}_{i+1}| + \sum_{k=2}^p (|\tilde{\alpha}_{i,k} - \tilde{\alpha}_{i,k-1}\tilde{h}_i| + |\tilde{\beta}_{i,k} - \tilde{\beta}_{i,k-1}\tilde{h}_{i+1}|) \quad (37)$$

Of particular relevance is the index $i_{branch}$ defined as the one that yields the maximum total relaxation error over all values of i:

$$i_{branch} = \operatorname*{argmax}_{i} R_i(\tilde{h}, \tilde{\rho}, \tilde{\varepsilon}, \tilde{\alpha}, \tilde{\beta}) \quad (38)$$

Because $i_{branch}$ maximizes the total discrepancy over all i-indexed collections of bilinear-term equations, it is therefore plausible to use it as a basis for branching, in an effort to minimize future relaxation errors which could in itself result in minimizing associated bound differences.

In one embodiment, a determination is made to choose between (1) splitting the original range of $h_{i_{branch}}$ i.e., $[-\gamma,\gamma]$ into $[-\gamma,\tilde{h}_{i_{branch}}]$ and $[\tilde{h}_{i_{branch}},\gamma]$ or (2) splitting the range of $\rho_{i_{branch}}$ i.e., $[\rho_{min},\rho_{max}]$ into $[\rho_{min},\tilde{\rho}_{i_{branch}}]$ and $[\tilde{\rho}_{i_{branch}},\rho_{max}]$. To qualify the optimal branching variable amongst the two choices, the relaxation envelopes are utilized, in one embodiment. Accordingly, $(\rho_i^-,\rho_i^+)$ and $(h_i^-,h_i^+)$ are assumed to be generic bounds on $\rho_i$ and $h_i$, respectively. Since all densities are required to be positive, the bounds on any $\alpha_{i,k}$ satisfy the following:

$$\ell(\rho_i^-, \rho_i^+, h_i^-, h_i^+, k) = \begin{cases} \rho_i^-(h_i^-)^k & \text{if } h_i^- \geq 0 \\ \min(\rho_i^-(h_i^-)^k, \rho_i^+(h_i^-)^k) & \text{if } h_i^+ \leq 0 \\ \min(0, \rho_i^+(h_i^-)^k) & \text{if } h_i^- \leq 0 \leq h_i^+ \end{cases} \quad (39)$$

$$\leq \alpha_{i,k} \leq \quad (40)$$

$$\hbar(\rho_i^-, \rho_i^+, h_i^-, h_i^+, k) = \begin{cases} \max(\rho_i^+(h_i^-)^k, \rho_i^-(h_i^+)^k) & \text{if } h_i^+ \leq 0 \\ \rho_i^+(h_i^+)^k & \text{if } h_i^+ \geq 0 \text{ and } k \text{ is odd} \\ \rho_i^+\max(|h_i^-|, h_i^+) & \text{if } h_i^+ \geq 0 \text{ and } \\ & k \text{ is even} \end{cases} \quad (41)$$

The bounds on any $\beta_{i,k}$ may be obtained using an analogous development. In fact, it can be quickly verified that for all i=1 ... n and k=1 ... p:

$$l(\rho_i^-, \rho_i^+, h_{i+1}^-, h_{i+1}^+, k) \leq \beta_{i,k} \leq h(\rho_i^-, \rho_i^+, h_{i+1}^-, h_{i+1}^+, k) \quad (42)$$

Using the above bounds, the total envelope margin at $(\tilde{h}, \tilde{\alpha}, \tilde{\beta})$ as a function of the bounds $(\rho_i^-, \rho_i^+, h_i^-, h_i^+, h_{i+1}^-, h_{i+1}^+)$ over $i_{branch}$ may be given by the following equation:

$$E_{i_{branch}}[\rho_{i_{branch}}^-, \rho_{i_{branch}}^+, h_{i_{branch}}^-, h_{i_{branch}}^+, h_{i_{branch}+1}^-, h_{i_{branch}+1}^+ \mid (\tilde{h}, \tilde{\alpha}, \tilde{\beta})] = + \quad (43)$$

$$\sum_{k=1}^{p} \left( \min \begin{cases} \hbar(v_{i_{branch},k}^\alpha)\tilde{h}_{i_{branch}} + h_{i_{branch}}^- \tilde{\alpha}_{i_{branch},k} - \hbar(v_{i_{branch},k}^\alpha)h_{i_{branch}}^-, \\ \ell(v_{i_{branch},k}^\alpha)\tilde{h}_{i_{branch}} + h_{i_{branch}}^+ \tilde{\alpha}_{i_{branch},k} - \ell(v_{i_{branch},k}^\alpha)h_{i_{branch}}^+ \end{cases} - \right.$$
$$\left. \max \begin{cases} \ell(v_{i_{branch},k}^\alpha)\tilde{h}_{i_{branch}} + h_{i_{branch}}^- \tilde{\alpha}_{i_{branch},k} - \ell(v_{i_{branch},k}^\alpha)h_{i_{branch}}^-, \\ \hbar(v_{i_{branch},k}^\alpha)\tilde{h}_{i_{branch}} + h_{i_{branch}}^+ \tilde{\alpha}_{i_{branch},k} - \hbar(v_{i_{branch},k}^\alpha)h_{i_{branch}}^+ \end{cases} \right) +$$

$$\sum_{k=1}^{p} \left( \min \begin{cases} \hbar(v_{i_{branch},k}^\beta)\tilde{h}_{i_{branch}+1} + h_{i_{branch}+1}^- \tilde{\beta}_{i_{branch},k} - \hbar(v_{i_{branch},k}^\beta)h_{i_{branch}+1}^-, \\ \ell(v_{i_{branch},k}^\beta)\tilde{h}_{i_{branch}} + h_{i_{branch}+1}^+ \tilde{\beta}_{i_{branch},k} - \ell(v_{i_{branch},k}^\beta)h_{i_{branch}+1}^+ \end{cases} - \right.$$
$$\left. \max \begin{cases} \ell(v_{i_{branch},k}^\beta)\tilde{h}_{i_{branch}} + h_{i_{branch}+1}^- \tilde{\beta}_{i_{branch},k} - \ell(v_{i_{branch},k}^\beta)h_{i_{branch}+1}^-, \\ \hbar(v_{i_{branch},k}^\beta)\tilde{h}_{i_{branch}} + h_{i_{branch}+1}^+ \tilde{\beta}_{i_{branch},k} - \hbar(v_{i_{branch},k}^\beta)h_{i_{branch}+1}^+ \end{cases} \right)$$

Where for purposes of concision, it is assumed that $v_{i_{branch},k}^\alpha = (\rho_{i_{branch}}^-, \rho_{i_{branch}}^+, h_{i_{branch}}^-, h_{i_{branch}}^+, k)$ and $v_{i_{branch},k}^\beta = (\rho_{i_{branch}}^-, \rho_{i_{branch}}^+, h_{i_{branch}+1}^-, h_{i_{branch}+1}^+, k)$.

In one embodiment, the procedure chooses to branch on the variable yielding the smaller sum of envelope margins over its two branches i.e., the one that minimizes the future envelope margin of the currently worst relaxation error. Thus, $h_{i_{branch}}$ is branched on by splitting its range of $[h_{i_{branch}}^-, h_{i_{branch}}^+]$ into $[h_{i_{branch}}^-, \hat{h}_{i_{branch}}]$ and $[\hat{h}_{i_{branch}}, h_{i_{branch}}^+]$ if the inequality equation (44) below holds. Otherwise, $\rho_{i_{branch}}$ is branched on by splitting its range of $[\rho_{i_{branch}}^-, \rho_{i_{branch}}^+]$ into $[\rho_{i_{branch}}^-, \hat{\rho}_{i_{branch}}]$ and $[\hat{\rho}_{i_{branch}}, \rho_{i_{branch}}^+]$.

$$E_{i_{branch}}[\rho_{i_{branch}}^-, \rho_{i_{branch}}^+, h_{i_{branch}}^-, \hat{e}_{i_{branch}}, h_{i_{branch}+1}^-, h_{i_{branch}+1}^+ \mid (\tilde{h}, \tilde{\alpha}, \tilde{\beta})] + E_{i_{branch}}[\rho_{i_{branch}}^-, \rho_{i_{branch}}^+, \hat{h}_{i_{branch}}, h_{i_{branch}}^+, h_{i_{branch}+1}^-, h_{i_{branch}+1}^+ \mid (\tilde{h}, \tilde{\alpha}, \tilde{\beta})] \leq E_{i_{branch}}[\rho_{i_{branch}}^-, \hat{\rho}_{i_{branch}}, h_{i_{branch}}^-, h_{i_{branch}}^+, h_{i_{branch}+1}^-, h_{i_{branch}+1}^+ \mid (\tilde{h}, \tilde{\alpha}, \tilde{\beta})] + E_{i_{branch}}[\hat{\rho}_{i_{branch}}, \rho_{i_{branch}}^+, h_{i_{branch}}^-, h_{i_{branch}}^+, h_{i_{branch}+1}^-, h_{i_{branch}+1}^+ \mid (\tilde{h}, \tilde{\alpha}, \tilde{\beta})] \quad (44)$$

With the branching scheme in place, the branch-and-bound algorithm for solving the original bilinear program recursively partitions (i.e., branches on) one of the hyper-rectangle constraints of a given instance of the relaxed linear program until each relaxed linear program instance either admits a sufficiently small objective bound difference or that its lower objective bound is already larger than the upper objective bound of some other relaxed linear problem instance.

Characterization of the Solution Variability

It is possible to compute globally optimal density and bed boundary vectors from the branch-and-bound algorithm. However, such solutions may not be unique. In fact, there may potentially be an infinite number of solutions yielding the lowest possible first norm of the error (total absolute mismatch between the simulated and observed logs), i.e. $\rho_{d \in D} \varepsilon_d$. That is because assuming that O* is the optimal objective value of the above bilinear problem i.e., $O^* = \Sigma_{d \in D} \varepsilon_d^*$ where $(\varepsilon_d^*)_{d \in D}$ is an optimal error vector, it is known from the geometrical theory of bilinear programming that the constraints in the above bilinear program and the additional equation of $\Sigma_{d \in D} \varepsilon_d = O^*$ yield in general a bounded bipolyhedral surface (in dimension on the order of the number of variables) where only globally optimal solutions live. Thus any two solutions in the underlying bipolyhedron may be equally optimal globally.

In one embodiment, the sensitivity of a globally optimal solution is assessed to determine its accuracy. This may be done by utilizing various schemes discussed below.

In one embodiment, P* is used to denote the bipolyhedron enclosing all globally optimal solutions and $z^* = (h^*, \rho^*, \varepsilon^*, \alpha^*, \beta^*)$ is one globally optimal solution. Subsequently, it is possible to find the one solution in P* that is most dissimilar to z* with respect to all or a subset of dimensions. One particularly relevant assessment of the largest dissimilarity between any two globally optimal solutions is in terms of their difference in their respective density vectors. This can be formulated as a constrained optimization problem as follows:

$$(h^{}, \rho^{}, \varepsilon^{}, \alpha^{}, \beta^{**}) = \underset{h, H^\beta, \rho, \overline{\rho}, \varepsilon}{\operatorname{argmax}} \|\rho - \rho^*\|_2^2 \quad (45)$$

$$\text{subject to } (h, \rho, \varepsilon, \alpha, \beta) \in P^* \quad (46)$$

Where $\rho^*$ and $\rho^{**}$ admit the same objective value O*, such that $\rho^{**}$ has the largest difference with respect to $\rho^*$ as assessed in terms of the Euclidean distance (square of the second norm of the difference). Because the underlying optimization problem can be optimized globally, the computed largest difference is indeed the largest, from a global optimization standpoint, and therefore the said difference may serve as a legitimate characterization of the maximum sensitivity of the obtained global solution.

It is also possible to compute a pair of globally optimal solutions of the largest possible dissimilarity. Such a measure may provide one characterization of the maximum span of the optimal solution space. Such a formulation may be set up as:

$$\operatorname*{argmax}_{z_1, z_2} \|\rho^{(1)} - \rho^{(2)}\|_2^2 \quad (47)$$

$$\text{subject to } \begin{cases} z_1 = (h^{(1)}, \rho^{(1)}, \varepsilon^{(1)}, \alpha^{(1)}, \beta^{(1)}) \in P^* \\ z_2 = (h^{(2)}, \rho^{(2)}, \varepsilon^{(2)}, \alpha^{(2)}, \beta^{(2)}) \in P^* \end{cases} \quad (48)$$

In addition to the above two characterizations of the optimal solution variability, it is also possible to compute quality indicators for any computed boundary correction or property value. In one embodiment, these quality indicators represent lower and upper bounds on any particular bed property value or an aggregation thereof. In another embodiment, the quality indicator represents the maximum variability for any combination of computed bed property values. In yet another embodiment, the quality indicator represents a statistic of interest on one or more computed bed property values or a combination thereof. To calculate quality indicators that represent lower and upper bounds on a particular bed property value, the lower bound on any optimal $\rho_i$ may be computed as the optimal objective value of $$\rho_i^l = \min_{s \in P^*} \rho_i.$$

Analogously, the largest optimal density value of the $i^{th}$ bed may be computed by $$\rho_i^h = \max_{s \in P^*} \rho_i.$$

It is also possible to determine statistical characterizations of the optimal solution space (e.g., mean and variance of the optimal density value of any bed).

It should be noted that although the procedures described herein are generally discussed for a single wellbore log as it pertains to the inversion of a density log, they are not bound to one dimension and are intrinsically scalable to the case of inverting multiple logs (e.g., nuclear density and neutron porosity). Generally, when the set of constraints discussed herein involving a log property exist for each possible log, the form of the bilinear problem and its associated relaxed linear problem remain fundamentally the same. However, if g represents the number of logs, the complexity of the number of constraints and that of the number of variables can be verified to be on the order of $O(g(|D|+np))$.

Managing Problem Size Complexity

The number of unknown variables in the above outlined bilinear and relaxed linear problem formulations is on the order of $(g(|D|+np))$. That is the number of unknown variables is proportional to the largest between the product of the number of logs and their length and the product of the number of logs, the number of beds, and the series order. The number of constraints is also $O(g(|D|+np))$. The complexity of this problem size may therefore be prohibitive, in some instances, for sizeable total log measurements, series orders, and/or bed sets.

In one embodiment, to remedy the problematic problem size effect, a specialized divide-and-conquer strategy is used to break the large problem into a number of smaller subproblems that afford solvability while being able to reconstruct the solution to the original problem from those of the individual subproblems up to acceptable levels of relaxations. Hence, the cumulative computational time required to solve and combine solutions from all subproblems becomes much more efficient than solving the original problem while still achieving a solution of enforceable quality.

This is done, in one embodiment, by partitioning the complete logged bedded formation into l batches, not necessarily of the same size: $d_0 < \ldots < d_1 < \ldots < d_2 < \ldots < d_{l-1} < \ldots < d_l$, where $d_0$ and $d_l$ indicate the depths at which logging started and ended, respectively. In one embodiment, it is assumed that $B_i$ denotes the batch of beds contributing to the simulated logs over the depth batch of $[d_{i-1}, d_i]$ $\forall i=1 \ldots l$.

In general, any two consecutive bed batches have several overlapping beds that contribute to the synthetic logs over both batches. This computational interdependency renders the subproblems not immediately separable. Such interbatch interactivity can be accounted for by having three passes at the data where in the first pass the subproblems are solved independently, in the second pass computations needed to assure integration of the information from each subproblem are performed, and in the third pass the results from all subproblems are appropriately integrated. This process can be further reduced to two passes using an alternative formulation, as will be explained afterwards.

For most decomposition problem instances (i.e., depth batch partitions and ARF function support domain spans), bed batch overlaps will occur only between immediate neighboring batches. Thus, for simplicity and without any loss of generality, it can be assumed that overlaps take place only at immediate neighboring batches. Referring to the original bilinear problem as BP, the individual bilinear subproblems over the respective bed batches can be designated as $BP_{B_1}, BP_{B_2}, \ldots, BP_{B_l}$. Each subproblem $BP_{B_i}$ may then be optimized independently during the first pass on the data.

By letting the subset of the $i^{th}$ bed batch that overlaps with bed batch $B_{i+1}$ for all $i=1 \ldots l-1$ be referred to as $B_i^u$, knowing the optimal objective value for any particular subproblem $BP_{B_i}$ and using the branch-and-bound method, a well-chosen convex envelope over the variables associated with the beds in $B_i^u$ can be computed. The said convex envelope can be denoted as $CE_i(B_i^u)$. Analogously, the same convex envelope over $B_i^u$ from the subproblem of the next bed batch i.e. $LP_{B_{i+1}}$ can be computed to yield $CE_{i+1}(B_i^u)$. Assuming that the two obtained convex envelopes are consistent (i.e., intersect one another) then the convex envelope $CE(B_i^u) = CE_i(B_i^u) \cap CE_{i+1}(B_i^u)$ represents a tight envelope around the global optimal space associated with the variables in $B_i^u$. Accordingly, all constraints in $BP_{B_i}$ and $BP_{B_{i+1}}$ involving the variables in $B_i^u$ are therefore substituted by the constraints in $CE(B_i^u)$ to yield updated neighbor-aware subproblems $\widehat{BP}_{B_i}$ and $\widehat{BP}_{B_{i+1}}$, respectively.

Assuming temporarily that after all of the $CE(B_i^u)$ substitutions are made for all $i=1 \ldots l-1$, all of the updated $\widehat{BP}_{B_1}, \widehat{BP}_{B_2}, \ldots, \widehat{BP}_{B_l}$ subproblems remain consistent (i.e., all individual optimal spaces intersect), a globally optimal (up to the allowed relaxations) solution may be constructed in a third pass as follows: (1) sampling a solution from the optimal space (bipolyhedron) associated with any particular subproblem; (2) locking the obtained values for the overlap variables in neighboring subproblem(s); and (3) repeating the steps for all remaining subproblems in any order.

Concatenating all sampled neighbor-aware individual solutions gives one relaxed global solution for the complete problem. It should be noted that, generally, the amount of computation needed for the relaxations depends on the choice of the convex envelopes. However, in one embodiment, for a given subproblem, it suffices to define the envelope only with respect to the density and all available log properties, and boundary perturbation variables for the overlapping beds. That means the number of variables in any envelope and therefore the complexity of its construction does not depend on the number of sample depths rather only on the number of beds in the overlap, hence promising an efficient computational overhead as the size of any overlap may be expected to be small in practice.

The just described problem decomposition algorithm relies on the assumption that all constructed convex envelopes are consistent, meaning that the optimal solution of the full problem may be computed from all individual optimal solutions from all subproblems. When the said envelopes are not consistent, the optimal solution of the whole problem cannot be reduced to computing optimal solutions of individual subproblems. Rather one or more subproblems must be solved sub-optimally. Additionally, there may be different combinations of subproblems that may be solved sub-optimally while yielding the same optimal objective value of the full problem. In one embodiment, to simplify the problem and simultaneously reduce the number of passes from three to two, the below discussed formulation can be used.

Instead of minimizing the first norm of the difference between the two sets of homologue logs (observed and synthetic), an a priori maximum difference error between any two homologue log values may be enforced. Such an error may be defined either marginally or relatively. That is, the measurement error in any observed log may be contained up to a well-defined threshold, $\sigma$. The value of $\sigma$ may be prefixed based on the expected measurement error. More generally, different values of $\sigma$ may be specified for each log property as different measurement tools admit varying measurement errors. Should the expectation of the measurement error change according to the sampling depth range or due to external operational conditions, the error threshold may be made to change according to depth. Thus, the decomposition algorithm can be readily applied with only two passes using this bounded error since there is no need to optimize an objective.

Accordingly, by using the above discussed operations and formulations, a relaxed linear formulation may be exploited to solve the original problem of accurately correcting detected bed boundary locations and predicting petrophysical bed property values while guaranteeing global optimality despite the inherent nonlinearity. This global optimality feature, in turn, makes it possible to most accurately characterize the uncertainty in the solution.

Figure 4:
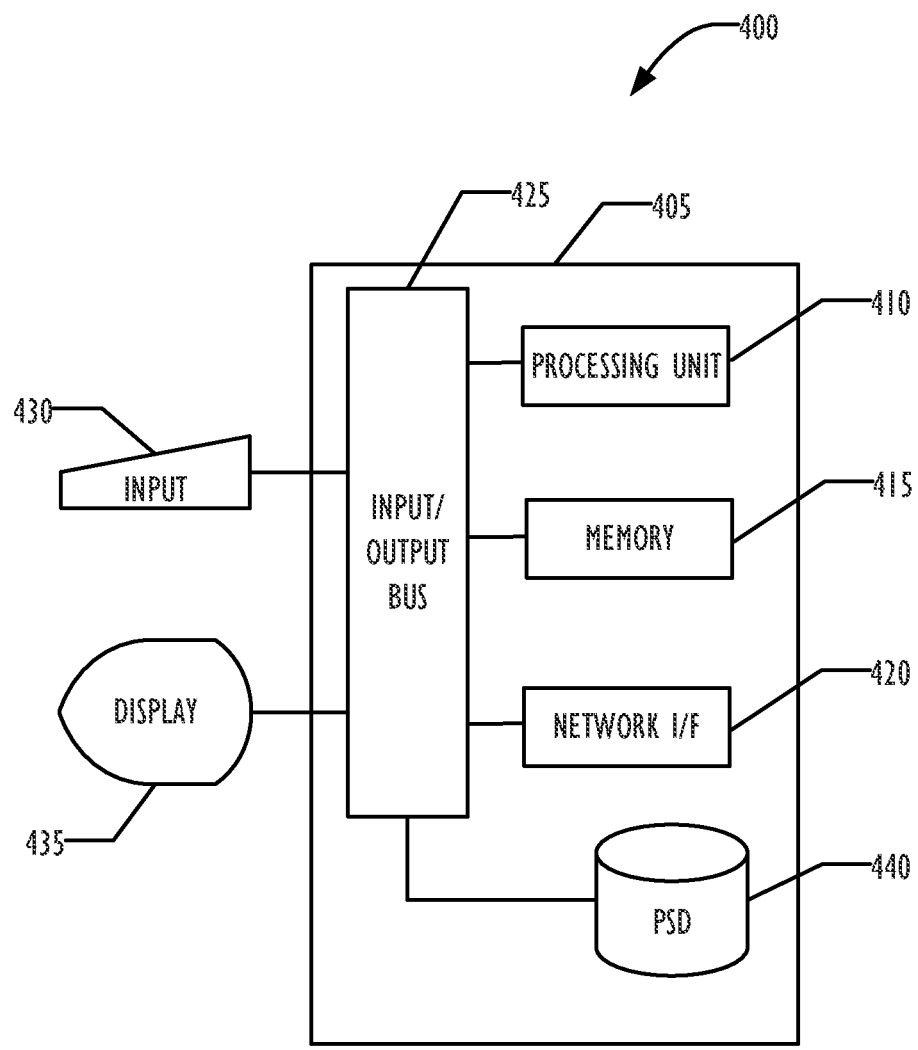
FIG. 4 is a block diagram illustrating a device which could be used as part of a system to execute the optimized bed boundary evaluation and property value calculation approaches described herein according to one or more disclosed embodiments.

Referring now to FIG. 4, an example processing device 400 for use in performing the optimization techniques discussed herein that are used to correct bed boundaries and predict associated petrophysical property values, is illustrated in block diagram form. Processing device 400 may serve as processor in a mobile phone, gateway or router, client computer, or a server computer. Example processing device 400 includes a system unit 405 which may be optionally connected to an input device 430 (e.g., keyboard, mouse, touch screen, etc.) and display device 435. A program storage device (PSD) 440 (sometimes referred to as a hard disk, flash memory, or non-transitory computer readable medium) is included with the system unit 405. Also included with system unit 405 is a network interface 420 for communication via a network (either cellular or computer) with other mobile and/or embedded devices (not shown). Network interface 420 may be included within system unit 405 or be external to system unit 405. In either case, system unit 405 will be communicatively coupled to network interface 420. Program storage device 440 represents any form of non-volatile storage including, but not limited to, all forms of optical and magnetic memory, including solid-state, storage elements, including removable media, and may be included within system unit 405 or be external to system unit 405. Program storage device 440 may be used for storage of software to control system unit 405, data for use by the processing device 400, or both.

System unit 405 may be programmed to perform methods in accordance with this disclosure. System unit 405 also includes one or more processing units 410, input-output (I/O) bus 425 and memory 415. Access to memory 415 can be accomplished using the input-output (I/O) bus 425. Input-output (I/O) bus 425 may be any type of interconnect including point-to-point links and busses. Processing unit 410 may include any programmable controller device including, for example, a mainframe processor, a mobile phone processor, or, as examples, one or more members of the INTEL ATOM®, and INTEL CORE® processor families from Intel Corporation and the Cortex® and ARM® processor families from ARM Limited Corporation. (INTEL, INTEL ATOM, and CORE are trademarks of the Intel Corporation. CORTEX is a registered trademark of the ARM Limited Corporation. ARM is a registered trademark of the ARM Limited Company). Memory 415 may include one or more memory modules and comprise random access memory (RAM), read only memory (ROM), programmable read only memory (PROM), programmable read-write memory, and solid-state memory.

As noted above, embodiments of the inventions disclosed herein may include software. As such, we shall provide a description of common computing software architecture. Like the hardware examples, the software architecture discussed here is not intended to be exclusive in any way but rather illustrative.

In the foregoing description, for purposes of explanation, specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process acts may be performed in an order different than discussed. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A method for evaluating a bedded formation for extraction of a commodity therefrom, the bedded formation having one or more bed boundary locations intersected by a wellbore, the method comprising:
    measuring image data for at least one wellbore log measured over the bedded formation having the one or more bed boundary locations intersected by the wellbore by logging the bedded formation with a wellbore logging tool in the wellbore;
    calculating at least one axial response function (ARF) for each of the at least one wellbore log;
    estimating one or more initial measurements for the one or more bed boundary locations;
    calculating a maximum bed boundary correction margin for the one or more initial measurements;
    calculating an optimized bed boundary location for each of the one or more initial measurements and calculating one or more petrophysical property values for the bedded formation by solving a constrained optimization problem based on the measured image data and the maximum bed boundary correction margin;
    correcting the image data of the bedded formation for the wellbore with the one or more calculated petrophysical property values relative to the one or more optimized bed boundary locations; and
    quantifying the commodity in the bedded formation using the corrected image data.

2. The method of claim 1, wherein one of the one or more petrophysical property values comprises a bed density value.

3. The method of claim 1, wherein one of the one or more petrophysical property values comprises at least one of bed porosity, gamma ray, spectral gamma ray, photoelectric absorption factor (PEF), elemental composition, neutron capture cross section, and acoustic velocity.

4. The method of claim 1, wherein one of the at least one wellbore logs comprises at least one of a density log, a porosity log, a gamma ray log, a spectral gamma ray log, a photoelectric absorption factor (PEF) log, an elemental composition log, a neutron capture cross section log, and an acoustic velocity log.

5. The method of claim 1, one of the at least one wellbore logs is an image log.

6. The method of claim 1, wherein the constrained optimization problem to compute the optimized bed boundary locations and one or more petrophysical property values is a nonlinear problem that is solved using an iterative alternating optimization between boundary corrections and inversion of petrophysical property values starting from the estimated initial measurements.

7. The method of claim 1, wherein the constrained optimization problem to compute the optimized bed boundary locations and petrophysical property values is reduced to a bilinear problem.

8. The method of claim 7, wherein the bilinear problem is decomposed into multiple subproblems when the constrained optimization problem is of a large scale.

9. The method of claim 7, wherein the bilinear problem is solved using a sequential linear programming procedure.

10. The method of claim 9, wherein the sequential linear programming procedure is coupled with a cutting plane procedure.

11. The method of claim 7, wherein the bilinear problem is solved by using a branch-and-bound-algorithm.

12. The method of claim 11, wherein the branch-and-bound algorithm for solving the bilinear problem is used to derive quality indicators for any of the calculated optimized bed boundary locations or petrophysical property values.

13. The method of claim 12, wherein the quality indicators represent at least one of one or more upper and lower bounds on one or more calculated petrophysical property values or an aggregation thereof.

14. The method of claim 12, wherein the quality indicators represent a maximum variability for any combination of the calculated petrophysical property values.

15. The method of claim 12, wherein the quality indicators represent a statistic of interest on one or more of the calculated petrophysical property values or a combination thereof.

16. The method of claim 7, further comprising casting the bilinear problem to a linear problem by employing convex and concave relaxations.

17. The method of claim 1, wherein calculating at least one ARF comprises:
    performing a simulation to compute a discretely sampled ARF; and
    modeling the discretely sampled ARF via a continuous model.

18. The method of claim 1, further comprising calculating one or more thresholds on a maximum error in the received data from the at least one wellbore log.

19. The method of claim 18, wherein the calculation of the optimized bed boundary locations and petrophysical property values is done by sampling from one or more bounded bipolyhedral spaces based on the received data, the correction margin, and the one or more thresholds.

20. A non-transitory program storage device, readable by a processor and comprising instructions stored thereon to cause one or more processors to perform a method for bed boundary measurement correction and petrophysical property prediction according to claim 1.

21. The non-transitory program storage device of claim 20, wherein the constrained optimization problem to calculate the optimized bed boundary locations and petrophysical property values is a nonlinear problem that is solved using an iterative alternating optimization between boundary corrections and inversion of petrophysical property values starting from the estimated initial measurements.

22. The non-transitory program storage device of claim 20, wherein the constrained optimization problem to compute the optimized bed boundary locations and petrophysical property values is reduced to a bilinear problem.

23. The non-transitory program storage device of claim 22, wherein the bilinear problem is decomposed into multiple subproblems when the constrained optimization problem is of a large scale.

24. The non-transitory program storage device of claim 22, wherein the bilinear problem is solved using a sequential linear programming procedure.

25. The non-transitory program storage device of claim 24, wherein the sequential linear programming procedure is coupled with a cutting plane procedure.

26. The non-transitory program storage device of claim 22, wherein the bilinear problem is cast to a linear problem by employing convex and concave relaxations.

27. The non-transitory program storage device of claim 22, wherein the bilinear problem is solved by using a branch-and-bound algorithm.

28. The non-transitory program storage device of claim 27, wherein the branch-and-bound algorithm for solving the bilinear problem is used to derive quality indicators for any of the calculated optimized bed boundary locations or petrophysical property values.

29. The non-transitory program storage device of claim 20, wherein the instructions stored thereon further cause the one or more processors to calculate one or more thresholds on a maximum error in the received data from the at least one wellbore log.

30. The non-transitory program storage device of claim 29, wherein the calculation of the optimized bed boundary locations and petrophysical property values is done by sampling from one or more bounded bipolyhedral spaces based on the received data, the correction margin, and the one or more thresholds.

31. The non-transitory program storage device of claim 20, wherein the instructions stored thereon cause the one or more processors to calculate at least one ARF by:
  performing a simulation to compute a discretely sampled ARF; and
  modeling the discretely sampled ARF via a continuous model.

32. A system for evaluating a bedded formation for extraction of a commodity therefrom, the bedded formation having one or more bed boundary locations intersected by a wellbore, the system comprising:
  a wellbore logging tool logging the bedded formation having the one or more bed boundary locations intersected by the wellbore and measuring image data for at least one wellbore log;
  a memory for storing the measured image data for the at least one wellbore log;
  a display device; and
  a processor operatively coupled to the memory and the display device and adapted to execute program code stored in the memory to:
    receive the measured image data from the at least one wellbore log measured over the bedded formation;
    calculate at least one axial response function (ARF) for each of the at least one wellbore logs;
    estimate one or more initial measurements for one or more bed boundary locations;
    calculate a maximum bed boundary correction margin for the one or more initial measurements;
    calculate an optimized bed boundary location for each of the one or more initial measurements and calculate one or more petrophysical property values for the bedded formation by solving a constrained optimization problem based on the received data and the maximum bed boundary correction margin;
    correct the image data of the bedded formation for the wellbore with the one or more calculated petrophysical property values relative to the one or more optimized bed boundary locations; and
    quantify the commodity in the bedded formation using the corrected image data.

33. The system of claim 32, wherein the constrained optimization problem to compute the optimized bed boundary locations and one or more petrophysical property values is a nonlinear problem that is solved using an iterative alternating optimization between boundary corrections and inversion of petrophysical property values starting from the estimated initial measurements.

34. The system of claim 32, wherein the constrained optimization problem to compute the optimized bed boundary locations and petrophysical property values is reduced to a bilinear problem.

35. The system of claim 34, wherein the bilinear problem is decomposed into multiple subproblems when the constrained optimization problem is of a large scale.

36. The system of claim 34, wherein the bilinear problem is solved using a sequential linear programming procedure.

37. The system of claim 36, wherein the sequential linear programming procedure is used with a cutting place procedure.

38. The system of claim 34, wherein the bilinear problem is solved using a branch-and-bound algorithm.

39. The system of claim 38, wherein the branch-and-bound algorithm for solving the bilinear problem is used to derive quality indicators for any of the calculated optimized bed boundary locations or petrophysical property values.

40. The system of claim 34, wherein the bilinear problem is cast to a linear problem by employing convex and concave relaxations.

41. The system of claim 32, wherein calculating at least one ARF comprises:
  performing a simulation to compute a discretely sampled ARF; and
  modeling the discretely sampled ARF via a continuous model.

42. The system of claim 32, wherein the processor is further adapted to execute program code stored in the memory to calculate one or more thresholds on a maximum error in the received data from the at least one wellbore log.

43. The system of claim 42, wherein the calculation of the optimized bed boundary locations and petrophysical property values is done by sampling from one or more bounded bipolyhedral spaces based on the received data, the correction margin, and the one or more thresholds.

* * * * *